United States Patent

[11] 3,590,935

| [72] | Inventor | Angelo Celia |
| | | 50 Notley Road, Silver Spring, Md. 20904 |
| [21] | Appl. No. | 772,943 |
| [22] | Filed | Nov. 4, 1968 |
| [45] | Patented | July 6, 1971 |

[54] CLUTCH AND ATTACHMENT DEVICE FOR VEHICLE WHEELS
2 Claims, 5 Drawing Figs.

[52] U.S. Cl. ........................................ 180/9.5, 305/29
[51] Int. Cl. ........................................ B62d 55/04
[50] Field of Search .............................. 180/5 A, 9.62, 9.26, 9.36, 9.34, 9.2; 305/29, 31, 32, 34

[56] References Cited
UNITED STATES PATENTS

| 1,433,122 | 10/1922 | Coffey | 180/5 (A) |
| 1,238,762 | 9/1917 | Hapeman | 180/5 (A) UX |
| 1,389,576 | 9/1921 | Caldwell | 180/9.26 |
| 1,411,523 | 4/1922 | Schlueter | 180/9.26 |
| 1,701,212 | 2/1929 | Nickerson | 180/5 (A) UX |
| 2,496,136 | 1/1950 | Smith | 305/29 X |
| 2,566,007 | 8/1951 | Weaver | 301/38 |
| 3,082,044 | 3/1963 | Klemm | 305/34 X |

FOREIGN PATENTS

| 239,868 | 2/1946 | Switzerland | 180/5 |

Primary Examiner—Richard J. Johnson
Attorney—Edwin E. Greigg

ABSTRACT: In a traction device for use with vehicle drive wheels having an endless track member mounted on spaced drive wheels, one of the drive wheels having a bracket extension member with manually operable clamping bolts for positive engagement with the rims of the vehicle drive wheels.

PATENTED JUL 6 1971          3,590,935
FIG.1
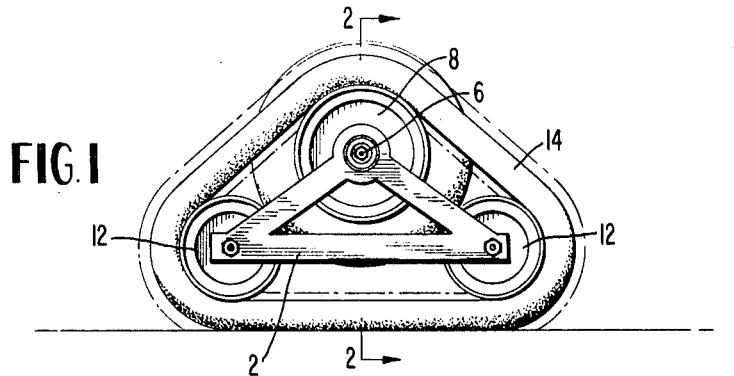
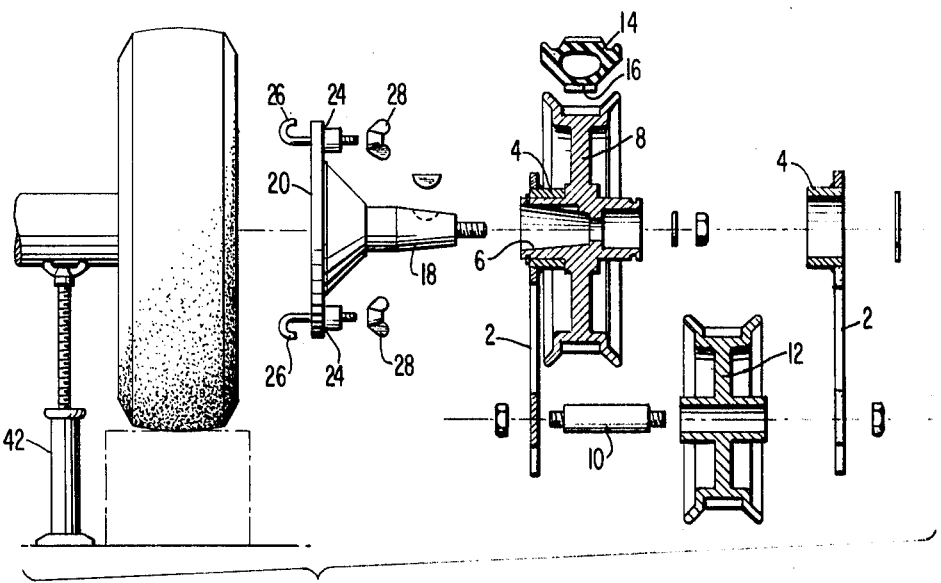
FIG.3
FIG.4
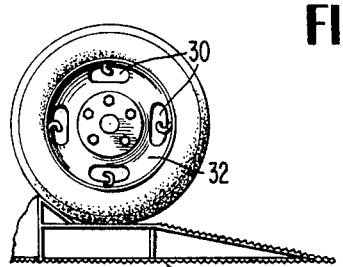
FIG.2
FIG.5
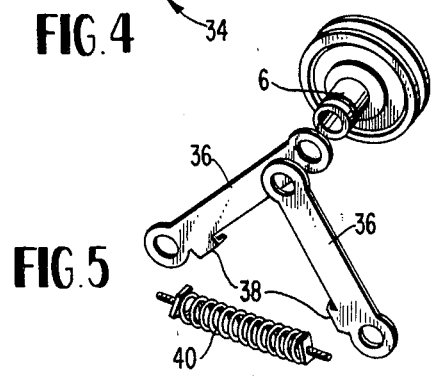
INVENTOR
ANGELO CELIA
BY
Edwin E. Greigg
ATTORNEY

CLUTCH AND ATTACHMENT DEVICE FOR VEHICLE WHEELS

This invention relates to traction devices adapted to support and assist wheeled vehicles in traversing ice, snow, mud, sand, and the like, and more particularly, to such a traction device which can be easily mounted or dismounted to the drive wheels of a vehicle for establishing a positive drive connection therebetween.

Heretofore, various traction devices have been designed for use with the drive wheels of an automobile where no special attachments, such as a chain drive or sprockets, are required for positively transferring the drive from the vehicle wheels to the traction device. In such devices roller means are provided for conveying the drive wheel motion to the traction device. This arrangement, however, because of the absence of a positive power drive connection, is subject to slipping between the drive wheel and the traction device, especially when the vehicle is being driven over unusually adverse terrain conditions. It is desirable, therefore, to have a positive drive connection between the vehicular drive wheels and the traction device for the purpose of negotiating varying kinds of terrain conditions, while at the same time having such a device which is portable and easily mounted or dismounted without the aid of extra attachments or a special drive wheel which normally has been the case with such devices employing a positive drive. Such attachments, as an extra wheel or a chain drive arrangement, would have to be mounted in the shop or garage for generally permanent use. It is the purpose of this invention to provide a traction device for automobiles which utilizes a positive drive and which can be readily mounted or dismounted without jacking-up the automobile or employing special tools and mounting equipment for installing the traction device.

Accordingly, it is an object of this invention to provide a traction device adapted for use with the vehicle drive wheels and which may be readily mounted or dismounted without the aid of special equipment or jacking-up the vehicle.

Another object of this invention is to provide a traction device which is readily mounted or dismounted with the vehicle drive wheels for establishing a positive drive connection therebetween.

Still another object of this invention is to provide a traction device for use with vehicle drive wheels which can be readily mounted or dismounted by a single person without the aid of special tools and equipment and when mounted, a positive drive between the wheels and the traction device is established.

It is yet another object of this invention to provide a traction device for use with vehicle drive wheels which is simple in construction and employs a minimum number of parts and which is reliable in operation.

According to one embodiment employing the principles of this invention, there is provided a triangular-shaped bracket supporting three sprocket wheels at its respective apexes which, in turn, support a flexible endless track member. One of the wheels has a bracket member bolted thereto which is adapted to fit against the rim portion of a conventional automobile drive wheel and is secured thereto by means of a plurality of J-bolts each having a wingnut thereon. The J-portion of the J-bolts engages the edges of the apertures normally provided at the periphery of the rim of the vehicle drive wheel. In order to secure the bracket to the respective rims of the vehicle drive wheels, the vehicle is backed up on a pair of portable ramp members provided for this purpose in order to raise the vehicle drive wheels above ground, at which time the bracket is mounted to the rim of the vehicle drive wheel by inserting the J-bolts into the aforementioned apertures and then tightening the wingnuts. The vehicle is then driven off the mounting blocks and the vehicle drive wheels will then impart a positive drive motion by means of the clamped bracket to the sprocket wheel of the traction device.

Other objects and advantages will become apparent from the following study of the specification and drawings, in which:

FIG. 1 is a side elevational view of the traction device according to the principles of this invention;

FIG. 2 is a cross-sectional view showing the traction device in assembled relation with a vehicle drive wheel;

FIG. 3 is an exploded diagram partly in cross section showing the traction device in relation to the vehicle drive wheel to which it is mounted;

FIG. 4 is a side elevational view of a conventional vehicle drive wheel showing the apertured rim portion which cooperates with the mounting bracket for the traction device according to the principles of this invention; and FIG. 5 shows a further embodiment for tensioning the track member around the sprocket wheels of the traction device.

Referring now to FIG. 1, there is shown one of the traction devices used with one of the vehicle drive wheels. It is to be understood that two such traction devices are provided for each of the rear drive wheels of the vehicle, but for the purpose of description, reference will be had to the one device. As shown in FIGS. 1 and 2, a pair of spaced parallel triangular-shaped bracket members 2 have at their upper apexes a bearing sleeve 4 which rotatably supports a bearing shaft 6 of a sprocket drive wheel 8. The lower apexes of the brackets 2 support by suitable screws and bolts the pinions 10 for mounting sprocket wheels 12, as shown. An endless track member 14 of flexible material, such as rubber, or the like, is supported by the sprocket drive wheel 8 and the wheels 12. The peripheral surfaces of the sprocket wheels 8 and 12 are notched for the purpose of engaging a corresponding notched inner peripheral surface 16 of the track member 14.

As shown in FIG. 2, the hollow bearing shaft 6 of the drive sprocket wheel 8 has bolted thereto a drive shaft 18, as best shown in FIG. 3. The drive shaft 18 supports a bracket plate 20 provided with circumferentially spaced apertures 24, each of which is adapted to loosely receive a J-bolt 26. The straight ends of the J-bolts are threaded and provided with wingnuts 28, as shown in FIG. 3.

As best shown in FIG. 4, the J-bolts 26 extend through the normally provided apertures 30 spaced along the periphery of the pressed steel rim 32 of a conventional automobile wheel. The J-members 26 can be rotated so that the curved portion will clamp the rear or inside surface of the steel rim with the wingnuts 28 being rotated in the threaded portion of the J-bolts so as to bear against the plate member 20 which, in turn, bears against the front or outside surface of the rim 32. A pair of portable ramp members 34 having a threaded or undulated surface on the ground contacting surface and the inclined ramp portion are provided for supporting the drive wheels of the automobile a distance spaced from ground.

In order to mount the traction device on the drive wheel of the vehicle it is only necessary to position the drive wheel of the vehicle on the ramp member 23, as above described, at which time the hubcap is removed from the wheel and the bracket plate 20 of the traction device is placed against the steel rim 32. A jack 42 may be provided, as shown, to lift the axle higher, if necessary, for proper alignment with the bracket plate 20. The J-bolts 26 are then extended into the apertures 30 provided on the steel rim. The wingnuts 28 of the J-bolts are then tightened against the plate member 20 so as to secure the J-bolts in a clamping engagement with the under surface of the rim 32. The vehicle is then driven off the ramp members 34 with the vehicle wheel driving by means of the bracket assembly drive shaft 18, the drive sprocket wheel 8 which, in turn, drives the endless track 14. Normally, there are four apertures provided in the rim 32 of the vehicle wheel, in which case there will be four J-bolts provided for the traction device according to this invention. When the J-bolts 26 are in clamping engagement with the under surface of the steel rim portion 32, the vehicle drive wheel will impart its drive motion by the appropriate edges of the apertures in the rim 32 acting against the respective J-bolts 26. Thus, a positive driving engagement is established between the vehicle wheel and the track member 14. When it is desired to remove or dismount the tracking device, the vehicle is merely driven back upon the ramp members 34 and the wingnuts 28 are loosened thus allowing the J-bolts to be withdrawn from the apertures 30.

In FIG. 5 there is shown an additional embodiment wherein provision is made for tensioning the endless track member around the sprocket wheels. For this purpose each of the brackets 2 is replaced by a pair of strut members 36 rotatably supported at their respective upper ends on the common bearing shaft 6. The lower ends of the strut members 36 are provided with apertures for supporting a respective pinion 10 in the manner above described. Each of the struts 36 is provided with an extending leg portion 38 to which is secured by suitable screws and bolts the ends of a coil spring 40, or the like. In this manner the struts 36 are allowed to spread outwardly under the weight of the automobile, thus causing the two lower sprocket wheels 12 to bear against the track member 14 thereby tensioning the track member around the drive wheel 8 as well as the sprocket wheels 12. The coil spring 40 imposes a counterrestraining force on the strut members 36 so that not all the weight of the vehicle is transmitted directly to the sprocket wheels 12 and hence to the track member at these two locations, but some of the weight is taken up by the restraining force of the coil 40 in the same manner that the crossbar or base of the triangular bracket 2 also takes up some of the weight of the vehicle.

That which I claim is:

1. A traction device in combination with the drive wheel of a vehicle, first bracket means including an enlarged disc-shaped perforated body portion, hook means carried by the body portion and extending through the perforations to permit securing the body portion to the wheel, said first bracket means further including an integral offstanding drive shaft arranged to be secured to said drive wheel with the axis of said shaft being coincident with drive wheel axis, drive pulley means keyed to the said drive shafts, said drive pulley means further including axially opposed cylindrical hub means, laterally spaced triangularly shaped flat strip members provided with axially aligned perforations at each apex thereof, at least one pair of said perforations at the upper apex being provided with a bearing sleeve and arranged to be positioned on the axially opposed hub means of said drive pulley means, spaced driven wheel members each including hub means positioned between the lower apex perforations of the flat strip members, stub shaft means including spaced means and having threaded end portions extending through the driven wheel hub means and arranged to fasten the spaced driven wheel members between the flat strip members, and an endless hollow track member having an inner surface encompassing the drive pulley means and said driven wheel members and driven by and supporting said drive wheel above the ground.

2. A traction device in combination with the drive wheel of a vehicle, first bracket means including an enlarged disc-shaped perforated body portion, hook means carried by the body portion and extending through the perforations to permit securing the body portion to the wheel, said first bracket means further including an integral offstanding drive shaft arranged to be secured to said drive wheel with the axis of said shaft being coincident with drive wheel axis, drive pulley means keyed to the said drive shafts, said drive pulley means further including axially opposed cylindrical hub means, first and second flat strip metal strut members each having front and rear surfaces including enlarged annular perforated ends thereof adjacent to the terminal end portions, said perforated area at one end of the first strut arranged to overlie and frictionally engage the flat face of the second strip, said juxtaposed perforated surfaces being positioned on said hub means and arranged to oscillate in a plane perpendicular thereto with the opposite perforated ends of the struts depending from the hub and assuming an inverted V-form, annular means secured to said hub means to retain the flat strip metal strut members thereon, each of said strut members being provided with integral, right-angularly bent, perforated leg portion each of which extends inwardly toward the hub means, a coil spring means provided at each end thereof with a rigid-threaded element for positioning in said perforated bent leg portions, nut means for fastening said threaded elements to said bent leg portions, two driven wheel members, each of said driven wheel members including hub means, the hub means of each of said driven wheel members being rotatably secured into the depending perforate strip members and an endless hollow track member having an inner surface encompassing the drive pulley means and said driven wheel members and driven by and supporting said drive wheel above the ground.